(12) United States Patent
Friesen et al.

(10) Patent No.: US 11,660,922 B2
(45) Date of Patent: May 30, 2023

(54) WHEEL SUSPENSION FOR A UTILITY VEHICLE

(71) Applicant: ZF FRIEDRICHSHAFEN AG, Friedrichshafen (DE)

(72) Inventors: Oleg Friesen, Osnabrück (DE); Holger Bublies, Osnabrück (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 94 days.

(21) Appl. No.: 17/431,673

(22) PCT Filed: Jan. 14, 2020

(86) PCT No.: PCT/EP2020/050787
§ 371 (c)(1),
(2) Date: Aug. 17, 2021

(87) PCT Pub. No.: WO2020/169271
PCT Pub. Date: Aug. 27, 2020

(65) Prior Publication Data
US 2022/0153076 A1 May 19, 2022

(30) Foreign Application Priority Data
Feb. 19, 2019 (DE) ...................... 10 2019 202 185.9

(51) Int. Cl.
*B60G 3/20* (2006.01)
*B60G 7/00* (2006.01)

(52) U.S. Cl.
CPC ............... *B60G 7/003* (2013.01); *B60G 3/20* (2013.01); *B60G 7/005* (2013.01); *B60G 7/006* (2013.01);
(Continued)

(58) Field of Classification Search
CPC .... B60G 7/003; B60G 7/006; B60G 2200/14; B60G 2200/44; B60G 2200/17;
(Continued)

(56) References Cited

U.S. PATENT DOCUMENTS 4,422,666 A * 12/1983 Proctor .................. B62D 17/00
280/124.171
5,346,241 A 9/1994 Lee
(Continued)

FOREIGN PATENT DOCUMENTS

DE 10 2005 042 821 3/2007
DE 20 2013 103607 9/2013
(Continued)

OTHER PUBLICATIONS

International Search Report issued in corresponding PCT Application PCT/EP2020/050787.
(Continued)

*Primary Examiner* — Drew J Brown
*Assistant Examiner* — Matthew Joseph Ganci
(74) *Attorney, Agent, or Firm* — Cozen O'Connor

(57) ABSTRACT

A wheel suspension for a vehicle includes: a steering knuckle support; a steering knuckle mounted at the steering knuckle support so as to be swivelable around a steering axis; a vehicle wheel mounted at the steering knuckle so as to be rotatable around a wheel rotational axis; and a plurality of links by which the steering knuckle support is articulated at a vehicle frame such that the steering knuckle support is moveable in a vertical direction of the vehicle relative to the vehicle frame. A first one of the links is configured as a first control arm configured as a four-bar link, and a second one of the links is configured as a second control arm arranged offset relative to the first link in the vertical direction of the vehicle, and wherein the second link is configured as a two-bar link that is adjustable in length.

17 Claims, 3 Drawing Sheets

(52) U.S. Cl.
 CPC ...... *B60G 2200/14* (2013.01); *B60G 2200/44* (2013.01)

(58) Field of Classification Search
 CPC .............. B60G 3/20; B60G 2200/1322; B60G 2200/144; B60G 2200/345; B60G 2300/08; B60G 7/001; B60G 2200/462; B60G 7/005; B60G 2200/46; B62D 7/18; B62D 7/20
 USPC ....................................................... 280/124
 See application file for complete search history.

(56) References Cited

U.S. PATENT DOCUMENTS

| | | | |
|---|---|---|---|
| 6,003,886 A | 12/1999 | Kiesel | |
| 6,170,838 B1* | 1/2001 | Laurent | B60G 3/01 280/5.521 |
| 8,387,740 B2* | 3/2013 | Melcher | F16D 3/221 475/222 |
| 9,988,083 B1* | 6/2018 | Smith | B60G 3/20 |
| 2004/0140641 A1* | 7/2004 | Eppelein | B60G 3/26 280/124.135 |
| 2008/0067773 A1 | 3/2008 | Chalin | |
| 2010/0237580 A1* | 9/2010 | Vortmeyer | B60G 7/005 280/124.134 |
| 2012/0104713 A1 | 5/2012 | Frens | |
| 2018/0237070 A1* | 8/2018 | Lorenz | B60G 3/20 |
| 2018/0347657 A1* | 12/2018 | Hinz | F16F 9/062 |

FOREIGN PATENT DOCUMENTS

| | | |
|---|---|---|
| DE | 10 2012 214 352 | 2/2014 |
| DE | 10 2014 210 595 | 12/2015 |
| DE | 10 2015 013 232 | 4/2017 |
| WO | WO 2006/114265 | 11/2006 |

OTHER PUBLICATIONS

Search Report dated Jun. 28, 2022 issued in German Patent Application No. 10 2019 202 185.9.

* cited by examiner

WHEEL SUSPENSION FOR A UTILITY VEHICLE

CROSS REFERENCE TO RELATED APPLICATIONS

This is a U.S. national stage of International application No. PCT/EP2020/050787, filed on Jan. 14, 2020, which claims priority to German Application No. 10 2019 202 185.9. filed Feb. 19, 2019, the content of each of which is incorporated herein by reference.

BACKGROUND OF THE INVENTION

1. Field of the Invention

The invention is directed to a wheel suspension for a utility vehicle with a steering knuckle support.

2. Description of the Related Art

DE 10 2014 210 595 A1 discloses a wheel suspension for a mobile agricultural machine with a drivable and steerable wheel head connectable to a frame part of the agricultural machine via an upper control arm and a lower control arm. The upper control arm and the lower control arm are articulated at a steering knuckle support, and the wheel head has a joint housing which is connected to the steering knuckle support so as to be twistable for a steering movement. A track rod is articulated at the joint housing. The upper control arm and the lower control arm are formed, respectively, as a triangular A-arm.

The concept according to DE 10 2014 210 595 A1 cannot be optimally adapted to different frame widths without also affecting the track width. Moreover, since this concept entails a change of camber during jounce/rebound, the system can also not be optimally adapted to different ride heights. In view of the use of two triangular links connected to the steering knuckle support via hinge joints, these triangular links may also be regarded as four-bar links in kinematic respects because, in theory, every hinge joint could be replaced by two ball joints. Accordingly, the system is overconstrained. In particular, the wheel torques around the vertical axis and transverse axis are sustained by both links. Further, the level of the respective reaction torques at the links depends on the system stiffnesses.

SUMMARY OF THE INVENTION

In view of the foregoing, it is an object of the invention to adapt the wheel suspension to different frame widths insofar as, e.g., the connection points of the first link are independent from the frame width. Further, it will be possible to prevent tensions at the steering knuckle support between the two links.

In one aspect, a wheel suspension for a utility vehicle has a steering knuckle support, a steering knuckle mounted at the steering knuckle support so as to be swivelable around a steering axis, a vehicle wheel mounted at the steering knuckle so as to be rotatable around an axis of rotation of the wheel, a plurality of links by which the steering knuckle support is articulated at a vehicle frame such that the steering knuckle support is movable in a vertical direction of the vehicle relative to the vehicle frame. A first one of the links forms a control arm configured as four-bar link, and a second one of the links forms a control arm which is arranged to be offset relative to the first link in the vertical direction of the vehicle, the second link is formed as a two-bar link which is adjustable in length.

Owing to the second link being formed as a two-bar link which is adjustable in length, a camber of the vehicle wheel can in particular be adjusted. Provided, e.g., that the connection points of the first link are independent from the frame width, the wheel suspension can be adapted and/or finely adjusted particularly to different frame widths and ride heights. The wheel suspension is also preferably statically determined in this way so that no tensions can occur in the steering knuckle support between the two links. In particular, the connection points of the links to the steering knuckle support need not be adapted to one another, or at least not strictly adapted to one another, during manufacturing.

A transverse direction of the vehicle is preferably associated with the wheel suspension and/or the utility vehicle. The first link and/or the second link or both links preferably extend, respectively, particularly in or approximately in the transverse direction of the vehicle or a transverse direction of the vehicle. The transverse direction of the vehicle preferably extends perpendicular to the vertical direction of the vehicle. The second link is advantageously adjustable in length in or approximately in transverse direction of the vehicle. The expression "frame width" means in particular the width or extension of the vehicle frame in transverse direction of the vehicle.

The expression "adjustable in length" in connection with the second link means in particular that the length of the second link is adjustable preferably in or approximately in transverse direction of the vehicle.

A longitudinal direction of the vehicle is preferably associated with the wheel suspension and/or the utility vehicle. In particular, the longitudinal direction of the vehicle extends perpendicular to the vertical direction of the vehicle. The longitudinal direction of the vehicle preferably extends perpendicular to the transverse direction of the vehicle.

The links preferably form or comprise two, or have exactly two, control arms. In particular, these control arms form or comprise the first link and the second link. The links advantageously form a control arm in each instance. The quantity of links and/or the quantity of control arms is preferably two. The second link is preferably arranged above the first link. The first link may be referred to in particular as lower control arm. Further, the second link may be referred to in particular as upper control arm. In particular, the second link is or forms a rod link.

The first link is preferably connected to the vehicle frame via two frame-side joints. The first link preferably comprises these frame-side joints. The frame-side joints of the first link are advantageously arranged so as to be offset relative to one another in the, or a, longitudinal direction of the vehicle or. The frame-side joints can likewise be arranged so as to be offset relative to one another in a vertical direction of the vehicle or can be situated at the same height. The frame-side joints of the first link are preferably formed as rubber bearings.

The first link is connected to the steering knuckle support, e.g., via a wheel-side joint. In particular, the first link comprises this wheel-side joint. The wheel-side joint of the first link is formed, for example, as a hinge joint.

The first link is preferably connected to the steering knuckle support via two wheel-side joints. The first link preferably comprises these wheel-side joints. The wheel-side joints of the first link are advantageously arranged so as to be offset relative to one another in the, or a a, longitudinal direction of the vehicle. The wheel-side joints can likewise be arranged so as to be offset relative to one another in a vertical direction of the vehicle or can be situated at the same height. The wheel-side joints of the first link are preferably formed in each instance as rubber bearings.

Owing to the configuration of the first link as a four-bar link connected to the vehicle frame via two frame-side joints and to the steering knuckle support via two wheel-side joints, a lever arm of any magnitude can be realized in particular between the wheel-side joints of the first link so that the reaction forces occurring during braking can be influenced with respect to construction. In particular, the corresponding reaction forces decrease proportionally with increasing distance between the wheel-side joints. In theory, only one of the frame-side joints and one of the wheel-side joints of the four-bar link will serve to support forces (longitudinal forces) acting in longitudinal direction of the vehicle because overconstraint can otherwise result. In practice, however, longitudinal forces can be distributed uniformly in the four-bar link over the joints (e.g., front and rear bearings) arranged at an offset to one another in longitudinal direction when bearings which are soft (longitudinally soft) in longitudinal direction of the vehicle are used as joints, e.g., rubber bearings.

According to a further development, the second link is connected to the steering knuckle support via a wheel-side joint and to the vehicle frame via a frame-side joint. The second link preferably comprises these joints. The wheel-side joint of the second link preferably has three rotational degrees of freedom. The frame-side joint of the second link advantageously has two or three rotational degrees of freedom. The wheel-side joint and the frame-side joint of the second link are preferably formed as ball joints in each instance.

According to an embodiment, the second link has an adjuster. Preferably, the length of the second link is adjustable, preferably in or approximately in transverse direction of the vehicle, by the adjuster. In other words, the second link is preferably adjustable in length, preferably in or approximately in transverse direction of the vehicle, by the adjuster. According to a first variant, the adjuster is formed as manual adjuster. In particular, the length of the second link is manually adjustable by the manual adjuster. Preferably, the manual adjuster has a threaded sleeve which is preferably provided with a width flat and into which two separate link parts of the second link, which are provided with a thread in each instance, are screwed by their threads, which are formed to be oppositely running. According to a second variant, the adjuster is formed as an automatic adjuster. In particular, the length of the second link is automatically adjustable by the automatic adjuster. The automatic adjuster comprises, e.g., an adjusting drive which is preferably an electric drive. In particular, the adjusting drive is a linear drive. The automatic adjuster and/or the adjusting drive are advantageously connected to a controller by which the adjuster and/or the adjusting drive are controllable.

According to a further development, a track rod is provided, which is preferably articulated at the steering knuckle. The steering knuckle is preferably connected to a vehicle steering device by the track rod. The steering knuckle is preferably swivelable around the steering axis by the track rod and/or by the vehicle steering device.

According to an embodiment, the first link, the second link or the steering knuckle support is connected to the vehicle frame via a damper. The first link, the second link or the steering knuckle support is preferably connected to and/or supported at the vehicle frame via a spring.

BRIEF DESCRIPTION OF THE DRAWINGS

The invention will be described in the following based on preferred embodiment referring to the drawings. In the drawings.

DETAILED DESCRIPTION OF THE DRAWINGS

Figure 1:
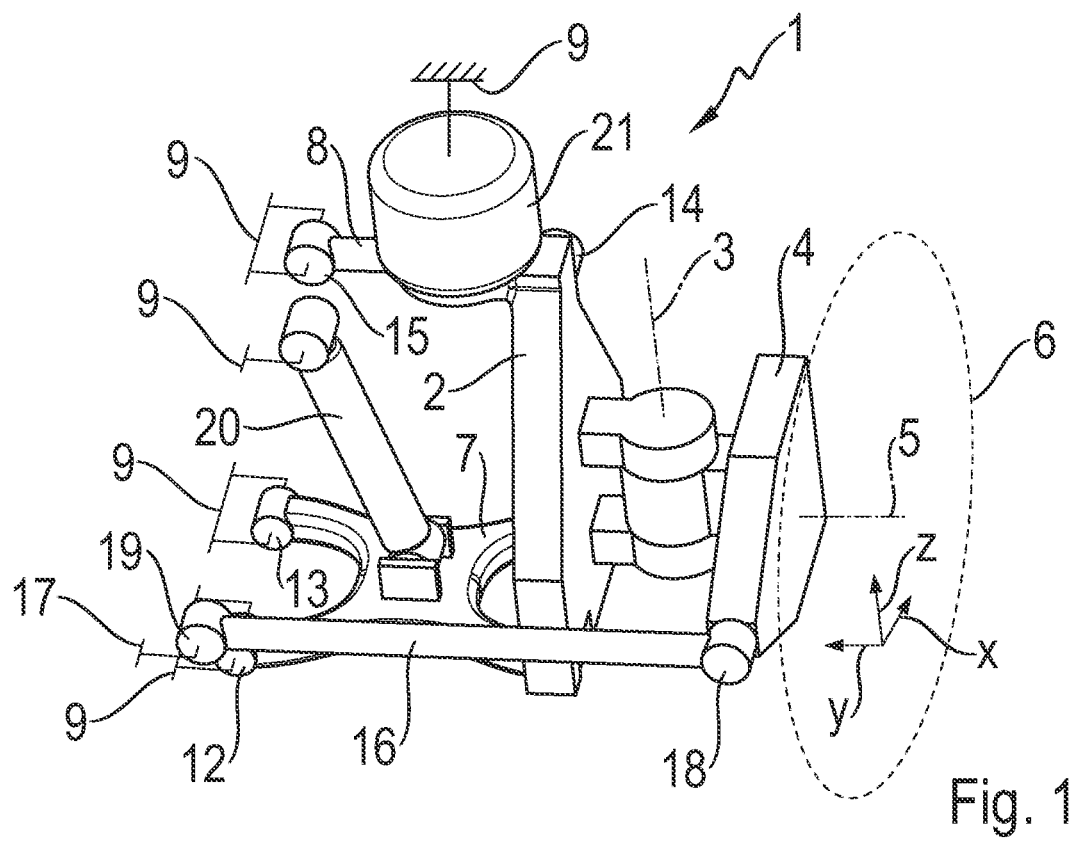
FIG. 1 is a perspective view of a wheel suspension according to a first embodiment.
Figure 2:
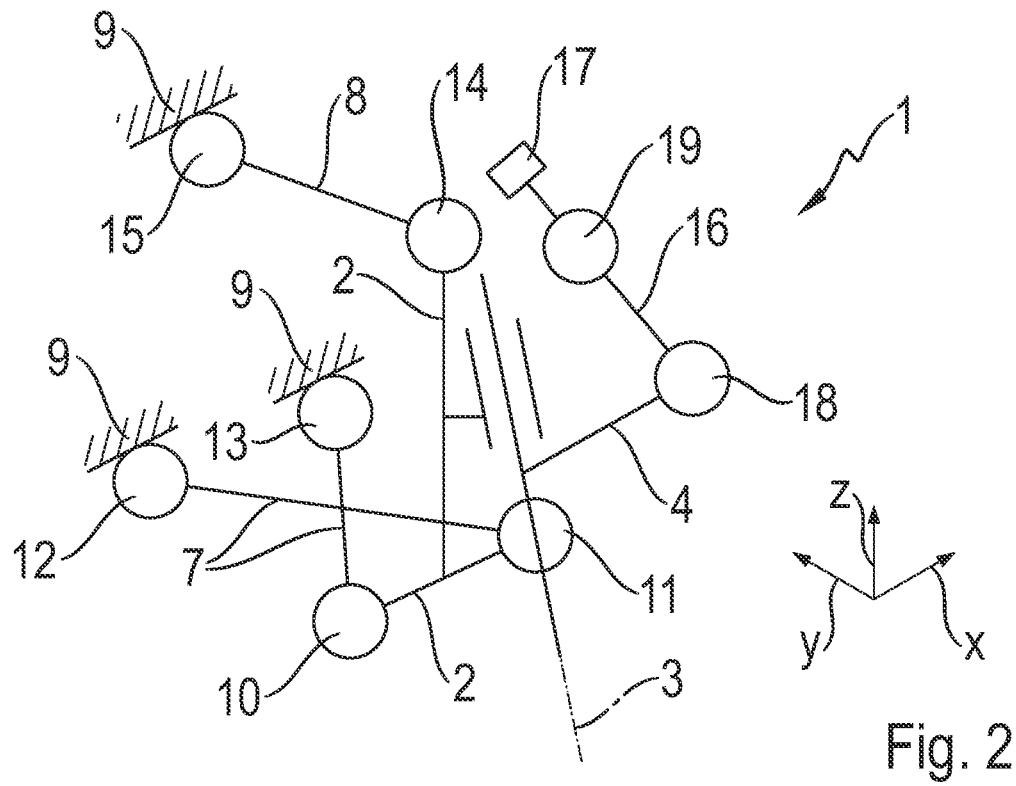
FIG. 2 is a schematic view of the wheel suspension according to the first embodiment.

FIG. 1 shows a perspective view of a wheel suspension 1 according to a first embodiment in which the wheel suspension 1 has a steering knuckle support 2, a steering knuckle 4 mounted at the steering knuckle support 2 so as to be swivelable around a steering axis 3, a vehicle wheel 6, only shown schematically, which is mounted at the steering knuckle 4 so as to be rotatable around a wheel rotational axis 5, and two links 7 and 8 by which the steering knuckle support 2 is articulated at a schematically shown vehicle frame 9 such that the steering knuckle support 2 is movable relative to the vehicle frame 9 in a vertical direction z of the vehicle. A first one of the links 7 forms a control arm, also referred to as a lower control arm, formed as a four-bar link. Further, a second one of the links 8 forms a control arm, also referred to as an upper control arm, which is arranged so as to be offset relative to the first link 7 in the vertical direction z of the vehicle and is formed as a two-bar link. In particular, the two links 7 and 8 extend in or approximately in a transverse direction y of the vehicle. FIG. 2 shows a schematic view of the wheel suspension 1 according to the first embodiment in which the vehicle wheel 6 is not shown.

The first link 7 is connected to the vehicle frame 9 via a damper 20. Further, the steering knuckle support 2 is connected to and/or supported at the vehicle frame 9 via a spring 21. The damper 20 and the spring 21 are not shown in FIG. 2.

The first link 7 is connected to the steering knuckle support 2 via two wheel-side joints 10 and 11 and to the vehicle frame 9 via two frame-side joints 12 and 13. The wheel-side joints 10 and 11 and the frame-side joints 12 and 13 of the first link 7 are arranged, respectively, so as to be offset relative to one another in a longitudinal direction x of the vehicle. In particular, the wheel-side joints 10 and 11 and the frame-side joints 12 and 13 of the first link 7 are formed as rubber bearings.

The second link 8 is connected to the steering knuckle support 2 via a wheel-side joint 14 and to the vehicle frame 9 via a frame-side joint 15. The wheel-side joint 14 of the second link 8 has three rotational degrees of freedom, and the frame-side joint 15 of the second link 8 has two or three rotational degrees of freedom. In particular, the wheel-side joint 14 and the frame-side joint 15 of the second link 8 are formed, respectively, as ball joints.

The steering knuckle 4 is connected to a vehicle steering device 17, shown schematically, by a track rod 16. The track rod 16 is connected to the steering knuckle 4 via a joint 18 and to the vehicle steering device 17 via a joint 19. Joints 18 and 19 are formed in particular as ball joints. A swiveling of the steering knuckle 4 around the steering axis 3 relative to the steering knuckle support 2 is carried out in particular by the vehicle steering device 17 via the track rod 16. In the schematic view according to FIG. 2, the track rod 16 is arranged offset in comparison with FIG. 1, but this is only for the sake of clarity.

Figure 3:
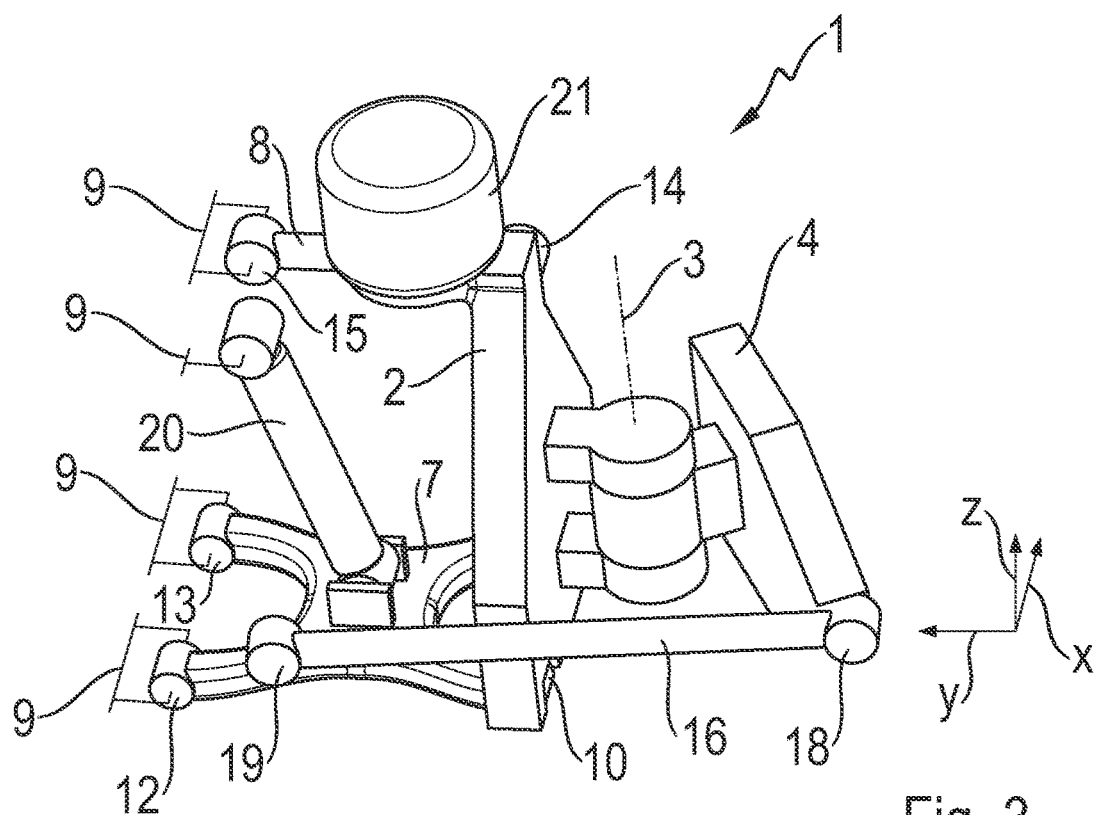
FIG. 3 is a perspective view of the wheel suspension according to the first embodiment in which the condition of a steering knuckle is such that it is swiveled around a steering axis.

FIG. 3 shows a perspective view of the wheel suspension 1 according to the first embodiment in which the steering knuckle 4 is swiveled around the steering axis 3 relative to the steering knuckle support 2. The vehicle wheel is not shown in FIG. 3.

Figure 4:
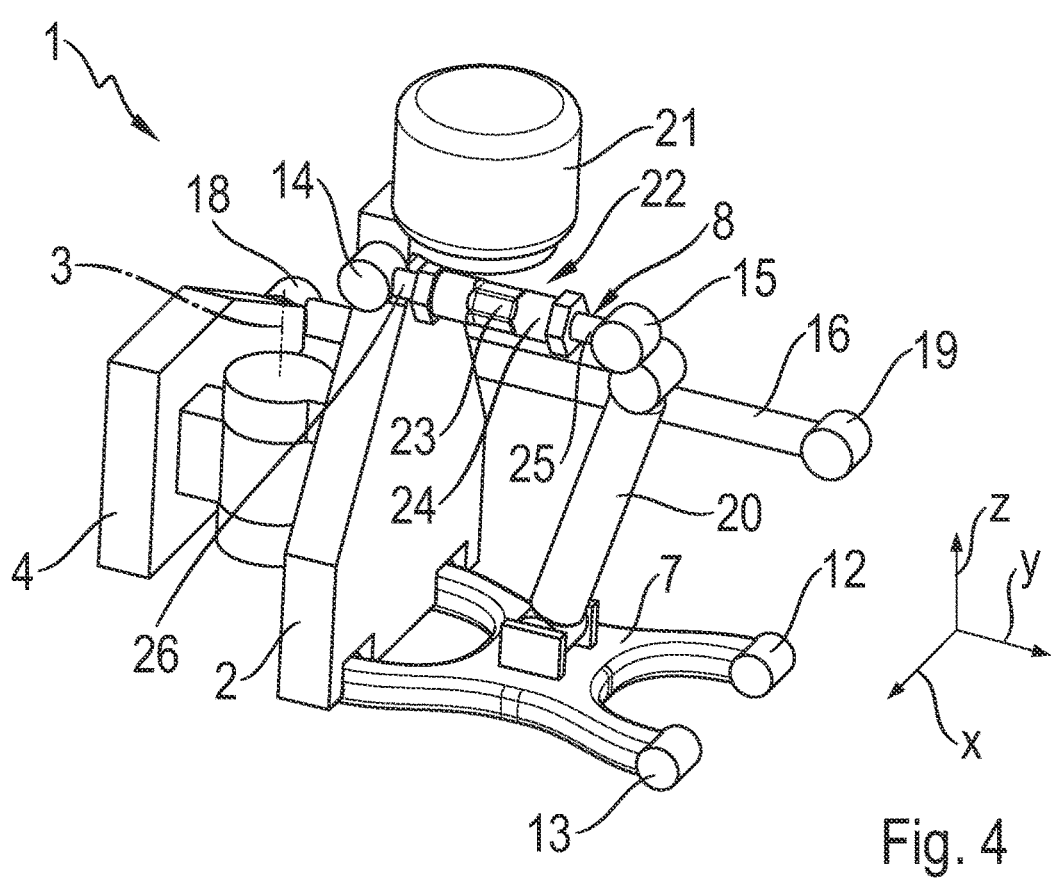
FIG. 4 is another perspective view of the wheel suspension according to the first embodiment.

FIG. 4 shows another perspective view of the wheel suspension 1 according to the first embodiment in which the second link 8 is shown more clearly. The second link 8 comprises an adjuster 22 by which the length of the second link 8 is adjustable particularly in or approximately in transverse direction y of the vehicle. According to the first embodiment, the adjuster 22 forms a manual adjuster and has a threaded sleeve 24 which is provided with a width flat 23 and into which two separate link parts 25 and 26 of the second link 8, which are provided with a thread in each instance, are screwed by their threads, which are formed in particular to be oppositely running. The vehicle wheel is not shown in FIG. 4.

Figure 5:
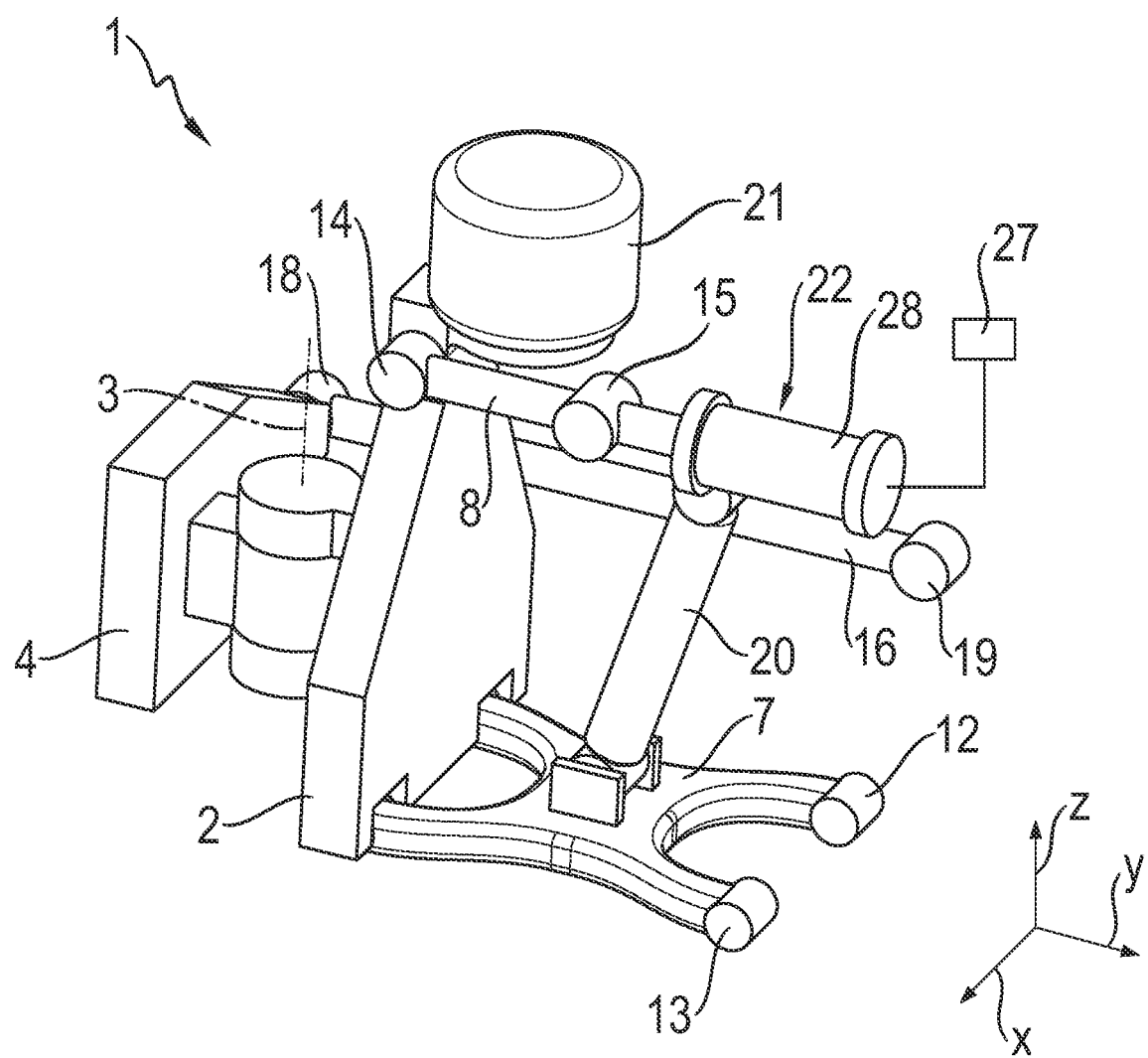
FIG. 5 is a perspective view of a wheel suspension according to a second embodiment.

FIG. 5 shows a perspective view of a wheel suspension 1 according to a second embodiment in which features identical or similar to the first embodiment are designated by the same reference numerals as in the first embodiment.

In contrast to the first embodiment, the adjuster 22 forms an automatic adjuster which is rigidly connected to the vehicle frame 9 and which has an adjusting drive 28, particularly a linear drive, which is connected to a controller 27, shown schematically. Apart from these differences, the second embodiment conforms to the first embodiment so that further description of the second embodiment can be dispensed with. The vehicle wheel is not shown in FIG. 5.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

REFERENCE CHARACTERS 1 wheel suspension
2 steering knuckle support
3 steering axis
4 steering knuckle
5 wheel rotational axis
6 vehicle wheel
7 first link
8 second link
9 vehicle frame
10 joint
11 joint
12 joint
13 joint
14 joint
15 joint
16 track rod
17 vehicle steering device
18 joint
19 joint
20 damper
21 spring
22 adjuster
23 width flat
24 threaded sleeve
25 link part
26 link part
27 control device
28 adjusting drive
x longitudinal direction of the vehicle
y transverse direction of the vehicle
z vertical direction of the vehicle

The invention claimed is:

1. A wheel suspension for a vehicle, comprising:
a steering knuckle support (2);
a steering knuckle (4) mounted at the steering knuckle support (2) and arranged between an upper end of the steering knuckle support (2) and a lower end of the steering knuckle support (2) so as to be swivelable around a steering axis (3);
a vehicle wheel (6) mounted at the steering knuckle (4) so as to be rotatable around a wheel rotational axis (5); and
a plurality of links (7, 8) by which the steering knuckle support (2) is articulated at a vehicle frame (9) such that the steering knuckle support (2) is moveable in a vertical direction (z) of the vehicle relative to the vehicle frame (9),
wherein a first one of the links (7) is configured as a first control arm configured as a four-bar link directly articulatedly attached at the lower end of the steering knuckle support (2), and a second one of the links (8) is configured as a second control arm arranged offset relative to the first link (7) in the vertical direction (z) of the vehicle and directly articulatedly attached at the upper end of the steering knuckle support (2), and
wherein the second link (8) is configured as a two-bar link that is adjustable in length.

2. The wheel suspension according to claim 1, wherein the plurality of links (7, 8) is two.

3. The wheel suspension according to claim 1, wherein the first link (7) is connected to the steering knuckle support (2) via one or two wheel-side joints (10, 11) and to the vehicle frame (9) via two frame-side joints (12, 13).

4. The wheel suspension according to claim 3, wherein the frame-side joints (12, 13) of the first link (7) are arranged so as to be offset relative to one another in a longitudinal direction (x) of the vehicle.

5. The wheel suspension according to claim 3, wherein the frame-side joints (12, 13) of the first link (7) are configured as rubber bearings.

6. The wheel suspension according to claim 3, wherein the wheel-side joints (10, 11) of the first link (7) are arranged so as to be offset relative to one another in a longitudinal direction (x) of the vehicle.

7. The wheel suspension according to claim 3, wherein the wheel-side joints (10, 11) of the first link (7) are configured as rubber bearings.

8. The wheel suspension according to claim 1, wherein the second link (8) is connected to the steering knuckle support (2) via a wheel-side joint (14) and to the vehicle frame (9) via a frame-side joint (15).

9. The wheel suspension according to claim 8, wherein the wheel-side joint (14) of the second link (8) has three rotational degrees of freedom, and the frame-side joint (15) of the second link (8) has two or three rotational degrees of freedom.

10. The wheel suspension according to claim 8, wherein the wheel-side joint (14) and the frame-side joint (15) of the second link (8) are configured as ball joints.

11. The wheel suspension according to claim 1, wherein the second link (8) has an adjuster (22) configured to adjust the length of the second link (8).

12. The wheel suspension according to claim 11, wherein the adjuster (22) is configured as a manual adjuster or as an automatic adjuster.

13. The wheel suspension according to claim 1, further comprising a track rod (16) configured to connect the steering knuckle (4) to a vehicle steering device (17).

14. The wheel suspension according to claim 1, wherein the first link (7) is connected to the vehicle frame (9) via a damper (20).

15. The wheel suspension according to claim 1, wherein the steering knuckle support (2) is connected to the vehicle frame (9) via a spring (21).

16. The wheel suspension according to claim 1, wherein the steering knuckle support (2) is substantially planar.

17. The wheel suspension according to claim 1, wherein
the steering axis (3) is arranged between the steering knuckle support (2) and the steering knuckle (4) and the steering knuckle support (2) and
the steering knuckle (4) are offset from each other in a direction substantially perpendicular to the steering axis (3).

* * * * *